United States Patent [19]
Klenk

[11] 3,763,992
[45] Oct. 9, 1973

[54] CONVEYOR TABLE FOR SHEET MATERIAL

[76] Inventor: Emil Klenk, Almstrasse 9, Murrhardt, Germany

[22] Filed: Feb. 16, 1972

[21] Appl. No.: 226,779

[30] Foreign Application Priority Data
Feb. 19, 1971 Germany.................. P 21 07 977.6

[52] U.S. Cl............................................. 198/127 R
[51] Int. Cl.............................................. B65g 13/07
[58] Field of Search .............................. 198/127 R

[56] References Cited
UNITED STATES PATENTS

| | | |
|---|---|---|
| 2,030,816 | 2/1936 | Fenton............................ 198/127 R |
| 3,638,779 | 2/1972 | Milazzo........................... 198/127 R |
| 916,853 | 3/1909 | Fonner............................ 198/127 R |
| 369,550 | 9/1887 | Phillips et al. ................. 198/127 R |
| 1,931,454 | 10/1933 | Anderson........................ 198/127 R |
| 2,712,377 | 7/1955 | Eggleston....................... 198/127 R |
| 2,036,900 | 4/1936 | Waldron ..................... 198/127 R X |
| 1,777,921 | 10/1930 | Hudson....................... 198/127 R X |
| 3,275,124 | 9/1966 | Lutes et al. .................... 198/127 R |
| 3,040,872 | 6/1962 | Hohl ............................... 198/127 R |
| 3,306,430 | 2/1967 | Fogg .............................. 198/127 R |

FOREIGN PATENTS OR APPLICATIONS

| | | | |
|---|---|---|---|
| 373,128 | 5/1932 | England........................ | 198/127 R |

Primary Examiner—Evon C. Blunk
Assistant Examiner—W. Scott Carson
Attorney—Nichol M. Sandoe et al.

[57] ABSTRACT

The invention contemplates a conveyor table with a plurality of spaced oblique work-supporting rollers, for guiding and conveying sheet material such as sheet paper while urging the same against a marginal side reference. Drive to these rollers is imparted by a single belt at one marginal side and engaging a corresponding plurality of belt-driven rolls which are oriented to rotate on axes perpendicular to the path of belt movement. Each belt-driven roll has a keyed or universal-joint connection to its corresponding work-supporting roller.

11 Claims, 6 Drawing Figures

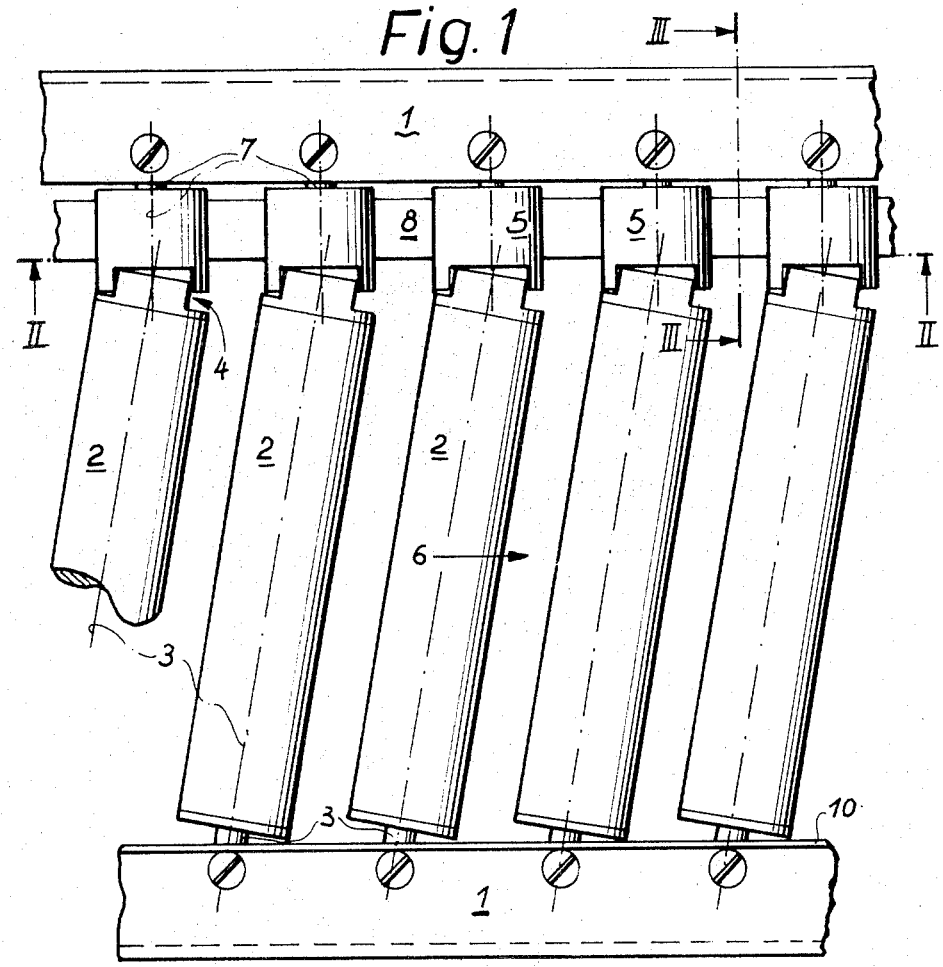

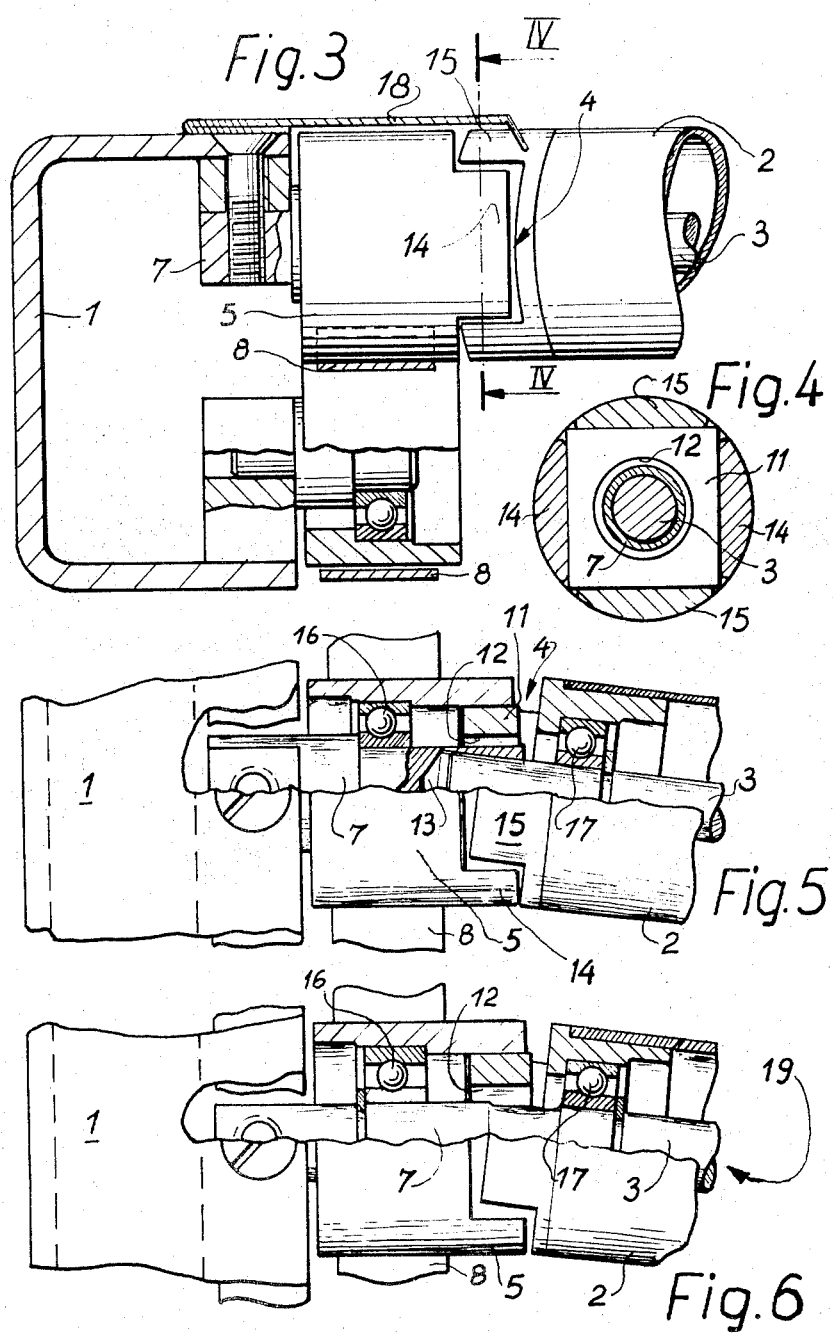

CONVEYOR TABLE FOR SHEET MATERIAL

The present invention relates to a conveyor table (a) with oblique rollers which can be driven by a belt and which are supported for rotation on spaced parallel axes, said axes forming an acute angle open towards the destination of conveyance and (b) with a straight-edge marginal guide extending in the direction of conveyance for the marginal reference of one side of the article to be conveyed.

Conveyor tables of this type are known, particularly for the transporting of sheets, especially sheets of paper. These conveyor tables serve to align a sheet upon its conveyance, in the direction of conveyance and simultaneously along the straight-edge margin which extends in the direction of conveyance. Due to the acute angle which the oblique rollers form with the straight edge, the driven rollers produce on the sheet a component of force by which the sheet is constantly urged against the straight edge in the course of its conveyed displacement.

In the known conveyor tables of this type, the drive belt extends perpendicular to the axes of the rollers, and it engages roller regions which are used to support and convey the sheet material. Due to the fact that the drive belt or belts in this case contact the rollers always at the same places, the oblique rollers become worn and locally smoothed at these places. The other parts of the oblique rollers with their relatively rough surface texture present a different coefficient of friction as compared with the smoothed regions. As a consequence, the sheet-conveying properties of known oblique rollers are impaired by this difference in smoothness. Also, since each drive belt extends transverse to the direction of conveyance, it is exposed to and becomes covered with dust very rapidly, so that its drive properties are thereby impaired.

It is also known to drive oblique rollers by means of spiral gears which are driven from a longitudinally extending shaft with mating gears. This embodiment is, however, very expensive.

The object of the present invention is to create a conveyor table having oblique rollers which can be driven by a belt and in connection with which the conveyance properties of the oblique rollers are not impaired by the belt.

It is also an object to meet the foregoing object with a construction which lends itself to the use of a single drive belt in connection with a greater number of driven rollers.

This object is achieved in accordance with the invention in the case of a conveyor table of the aforementioned type in the manner that the oblique rollers are connected at their one end via a keyed or universally jointed shaft connection with belt-driven rollers which are supported for rotation around shafts which are perpendicular to the direction of conveyance. As a result, the belt does not contact and therefore does not wear the oblique rollers; the belt only contacts the rolls, so that conveying properties of the oblique rollers are not impaired by the belt. Another advantage is that the belt lies outside the path of conveyance of the articles being conveyed, so that it does not become covered with dust as rapidly and thus have its drive properties impaired. It is particularly advantageous in this connection that the belt-driven rolls and the oblique rollers can be made of different materials and with different surface properties in such a manner that the rolls are particularly well suited for drive by the belt and the oblique rollers are particularly suited for the conveying of the particular articles, for instance sheets of paper.

In one embodiment of the invention, it is contemplated that both the oblique rollers and the belt-driven rolls are supported for rotation around shafts which are arranged fixed in the table frame. In this connection, the shaft joint may advantageously be a simple dog clutch having a prismatic clutch block which is seated loosely for rotation on the fixed shafts of the roll and of the oblique roller, being in dogged engagement with each of them. In this way there is obtained a particularly simple and inexpensive construction.

The invention is explained in detail in the following description of two embodiments of conveyor tables in accordance with the invention, shown by way of example in the drawings in which:

FIG. 1 is a fragmentary plan view of the first embodiment;

FIGS. 2 and 3 are sections along the line II—II and III—III respectively of FIG. 1, FIG. 3 being on an enlarged scale;

FIG. 4 is a section along the line IV—IV of FIG. 3;

FIG. 5 is a fragmentary plan view, partially broken away and in section and showing the support of a belt-driven roll and its associated oblique roller; and FIG. 6 is a view similar to FIG. 5 but applicable to the second embodiment.

In a table frame 1, oblique rollers 2 are supported for rotation around spaced parallel horizontal shafts 3 which are firmly connected to the table frame 1. Each of the oblique rollers 2 has a keyed connection at one end to a belt-driven roll 5, via one of a corresponding plurality of shaft joints 4. Each roll 5 is supported for rotation around a horizontal pin or stand 7 which is perpendicular to the direction 6 of conveyance. The upper course of an endless rotating belt 8 lies against the bottom of the rolls. Between the rolls 5, there are provided, on the upper course of the belt 8, pressing rollers 9 which act on said course and by which the belt 8 is pressed against the rolls 5. It will be understood that the belt 8 travels around guide rolls, not shown in the drawing, one of which is also adapted to be driven by drive means, also not shown in the drawing. At the other ends of the oblique rollers 2, i.e., the ends facing away from the rolls 5, the table frame 1 forms or includes a straight-edge marginal guide 10 for the sheets to be conveyed on the oblique rollers 2.

In the form shown, the shaft joint 5 is a coupling having a coupling block 11 of parallelopiped shape. Block 11 has a bore hole 12 for reception of the fixed pin 7 of the roll 5 (FIG. 5). The pin 7 has at its end an oblique bore 13 for reception of the free end of the shaft 3 of the corresponding oblique roller 2. The adjacent facing ends of each roll 5 and of its corresponding oblique roller 2 form forks or dogs 14 and 15, respectively which rest against opposing faces of the coupling block 11 so that each roll 5 is coupled with its associated oblique roller 2 via a coupling block 11. Each roll 5, in the same way as each oblique roller 2, is rotatably supported by means of ball bearings 16 and 17 on shafts 7 and 3, respectively.

The rolls 5 consist of a material which presents the largest possible coefficient of friction at contact with belt 8, and the surface of the rolls is preferably roughened or otherwise developed for particularly good frictional engagement with the belt.

On the other hand, the oblique rollers 2, for reasons of stability and strength, preferably consist of steel and have a surface which has in known manner been particularly carefully machined and finished for the transportation of the particular material to be conveyed, for example for the transporting of sheets of paper.

The modified embodiment shown in FIG. 6 differs from the preceding embodiment merely by the fact that in this case the shafts 3 and 7 form arms of a common shaft 19 which is bent in accordance with the angle which the oblique rollers 2 form with the straight edge 9.

During operation, the belt 8 is continuously driven, thus driving the rolls 5 which, in their turn, via the coupling block 11, drive the oblique rollers 2 in a rotary motion during which the work-supporting surface of the oblique rollers 2 moves in the direction 6 of conveyance. The material being conveyed is thereby conveyed by the oblique rollers 2 in the direction 6 of the conveyance, while urged against the marginal reference 10.

In order to avoid dust on the belt 8 and the rolls 5, a plate 18 can be provided to the rolls 5; such a plate has been shown by way of example in FIG. 3, but has been omitted from the other figures, for better exposure of internal mechanism.

What is claimed is:

1. In a conveyor table of the character indicated, spaced elongate frame members and a plurality of conveyor rollers rotatably mounted on frame-based spaced parallel conveyor-shaft members extending between said frame members and rigidly secured to one of said frame members, said roller shaft members being oblique to the elongation of said frame members, an elongate marginal guide carried by one of said frame members at an elevation to marginally guide an article conveyed by said rollers in a given longitudinal conveying direction, said roller shaft members forming with said guide an acute angle which is open toward the destination of conveyance in said direction, belt-drive means including a plurality of belt-driven rolls on frame-based drive-roll shaft members normal to the said direction of conveyance and rigidly secured to the other of said frame members, adjacent ends of corresponding conveyor-shaft and drive-roll shaft members being connected to each other, there being for each conveyor roller a separate belt-driven roll and coupling means keying one axial end of the conveyor roller to the adjacent axial end of the belt-driven roll, and a single drive belt having a longitudinal course and driving a plurality of said belt-driven rolls in common.

2. The conveyor table of claim 1, in which, for each belt-driven roll and its corresponding conveyor roller, the shaft members are fixed to each other.

3. The conveyor table of claim 1, in which the belt-driven rolls are positioned at the ends of conveyor rolls remote from said guide.

4. The conveyor table of claim 1, in which each roll and its associated roller are independently mounted to their associated shaft members on antifriction bearings.

5. The conveyor table of claim 1, in which said coupling means comprises dog-clutch means comprising coacting elements associated with each roll and its associated roller.

6. The conveyor table of claim 5, in which each said dog-clutch means includes a prismatic coupling block loosely carried by associated shaft members for rotation on the respective fixed axes of the associated roll and roller and engaged by the coacting elements of said dog-clutch.

7. The conveyor table of claim 2, in which each pair of associated shaft members comprises a single fixed shaft, bent at said coupling means to define the respective roll and roller axes.

8. The conveyor table of claim 1, in which said belt-driven rolls are of a material selected for a relatively high coefficient of friction with resepct to said belt.

9. The conveyor table according to claim 3, in which an elongate dust guard is carried by the frame member adjacent said belt-driven rolls and is positioned in vertical registry over said belt-driven rolls.

10. A conveyor table, comprising spaced elongate parallel frame members and a plurality of like longitudinally spaced fixed shaft means rigidly secured at both ends of said frame members, each shaft means including a conveyor-roller supporting portion and a drive-roll supporting portion, the conveyor-roller supporting portions being fixed at the same acute angle to one frame member and the drive-roll supporting portions being fixed at a right angle to the other frame member, conveyor rollers rotatably mounted on the conveyor-roller supporting portions and drive rollers rotatably mounted on the drive-roll supporting portions, coupling means keying adjacent axial ends of the conveyor roller and drive roll mounted on each shaft means, and a single drive belt having a longitudinal course in the alignment of said drive rolls and driving the same in common.

11. A conveyor table according to claim 11, and including an elongate side-margin guide carried by said frame at an elevation to marginally guide an article conveyed by said rollers in said direction, the roll-supporting portions of said shaft means forming with said guide an acute angle which is open in said direction.

* * * * *